United States Patent
Passenbrunner et al.

(10) Patent No.: US 9,513,190 B2
(45) Date of Patent: Dec. 6, 2016

(54) HYDRODYNAMIC TORQUE GENERATOR FOR TEST BENCHES AND CONTROL METHOD THEREFOR

(75) Inventors: Thomas E. Passenbrunner, Dietach (AT); Mario Sassano, Rome (IT); Hannes Trogmann, Steyregg (AT); Luigi Del Re, Linz (AT); Helmut Kokal, Graz (AT); Martin Schmidt, Langen (DE); Michael Paulweber, Hausmannstätten (AT)

(73) Assignee: AVL List GmbH, Graz (AT)

( * ) Notice: Subject to any disclaimer, the term of this patent is extended or adjusted under 35 U.S.C. 154(b) by 420 days.

(21) Appl. No.: 14/128,336

(22) PCT Filed: Jun. 6, 2012

(86) PCT No.: PCT/EP2012/060709
§ 371 (c)(1),
(2), (4) Date: Jun. 26, 2014

(87) PCT Pub. No.: WO2012/175337
PCT Pub. Date: Dec. 27, 2012

(65) Prior Publication Data
US 2014/0326059 A1 Nov. 6, 2014

(30) Foreign Application Priority Data
Jun. 24, 2011 (AT) .................................. A 928/2011

(51) Int. Cl.
*G01M 15/02* (2006.01)
*G01M 15/04* (2006.01)

(52) U.S. Cl.
CPC ........... *G01M 15/042* (2013.01); *G01M 15/02* (2013.01)

(58) Field of Classification Search
USPC ............... 73/116.01, 116.02, 116.04, 116.05, 73/118.01, 118.02
See application file for complete search history.

(56) References Cited

U.S. PATENT DOCUMENTS

| 4,020,684 | A  | 5/1977  | Dodt      |
| 5,834,654 | A  | 11/1998 | McFarland |
| 7,032,464 | B2 | 4/2006  | Lo        |

FOREIGN PATENT DOCUMENTS

| DE | 3733513    | 4/1989  |
| EP | 2189771    | 5/2010  |
| JP | 2006317372 | 11/2006 |

OTHER PUBLICATIONS

English Abstract of EP 2189771.
English Abstract of DE 3733513.
English Abstract of JP2006317372.
English Abstract of JP5217168.

*Primary Examiner* — Eric S McCall
(74) *Attorney, Agent, or Firm* — Dykema Gossett PLLC

(57) ABSTRACT

A hydrodynamic torque generator for test benches includes at least one inlet valve and at least one outlet valve, and a control device for valve positioning, the control device including an open-loop feed-forward controller and a closed-loop feedback controller.

3 Claims, 2 Drawing Sheets

HYDRODYNAMIC TORQUE GENERATOR FOR TEST BENCHES AND CONTROL METHOD THEREFOR

This application is a U.S. national phase of PCT/EP2012/060709, file 6 Jun. 2012, which derived from Austrian Application No. A0928/2011, filed 24 Jun. 2011. All priorities are claimed.

BACKGROUND OF THE INVENTION

The invention relates to a hydrodynamic torque generator for test benches having at least one net valve and at least one outlet valve, and having at least one control device for valve positioning coupled to these valves, and a control method for hydrodynamic torque generators, in particular in dynamic test benches.

Dynamic test benches are used to load an internal combustion engine, for example, such as in a passenger car or a commercial vehicle. Unlike measurements in a real vehicle, on a dynamic test bench, reproducible conditions with regard to loading of the test object under investigation, the temperatures, the pressures, etc., can be guaranteed, and the time as well as the costs for parameterizing, testing and taking statutorily-prescribed measurements can be reduced. Torque generators used on test benches of this kind are not limited to a particular type; for example, as well as electrical machines, hydrodynamic machines with variable filling level can be used.

Frequently, dynamic test benches for smaller and medium power internal combustion engines (passenger car engines, truck engines, etc.) are equipped with an electrical machine which is connected to the engine under test by means of a test shaft. In contrast with this, steady-state measurements on medium and higher power internal combustion engines are currently frequently carried out on test benches with hydrodynamic machines, which typically have lower dynamics and fewer control problems than electrical machines, yet constitute a very economic alternative.

It is therefore the object of the present invention to specify a design for a hydrodynamic torque generator and a control method therefor to also allow a machine of this kind to be used on dynamic test benches.

SUMMARY OF THE INVENTION

To achieve this object, according to the invention, it is provided that a control system which consists of an open-loop feed-forward controller and a closed-loop feedback controller is implemented in the control device. With a design of this kind, it is also possible to use hydrodynamic machines with their very low mechanical inertia for dynamic measurements.

According to a first advantageous embodiment, the torque generator is further characterized in that an open-loop feed-forward controller, which is based on an inversion of the static, non-linear characteristic map of the torque generator, is implemented in the control device.

According to the invention, a further embodiment is characterized in that at least one inlet valve and at least one outlet valve are jointly coupled to the control device. Here, the feedback branch therefore consists of a single and very simple controller which, in the simplest case, acts in the same way on the inlet and outlet valve.

To achieve the object, according to the invention, the control method is characterized in that the filling level of the torque generator is varied by means of an open-loop feed-forward controller and a closed-loop feedback controller which determine the position of at least one of the valves of the torque generator.

Here, a preferred embodiment provides that the position of at least one outlet valve and, at the same time, at least one inlet valve is determined by means of the open-loop feed-forward controller and the closed-loop feedback controller.

Preferably, the open-loop feed-forward controller is based on an inversion of the static, non-linear characteristic map of the torque generator.

An advantageous embodiment of the method according to the invention is further characterized in that the positions of inlet and outlet valve are calculated from the required torque in the open-loop feed-forward controller using an additional condition.

According to a further embodiment, adherence to limiting values for the temperature of the fluid of the torque generator is ensured as the additional condition.

The method according to the invention is formulated particularly advantageously in a variant in which the working point of the torque generator tracks a specifiable reference value, if necessary offset in time.

In the following description, the invention is described in more detail based on preferred examples and with reference to the drawings.

Figure 1:
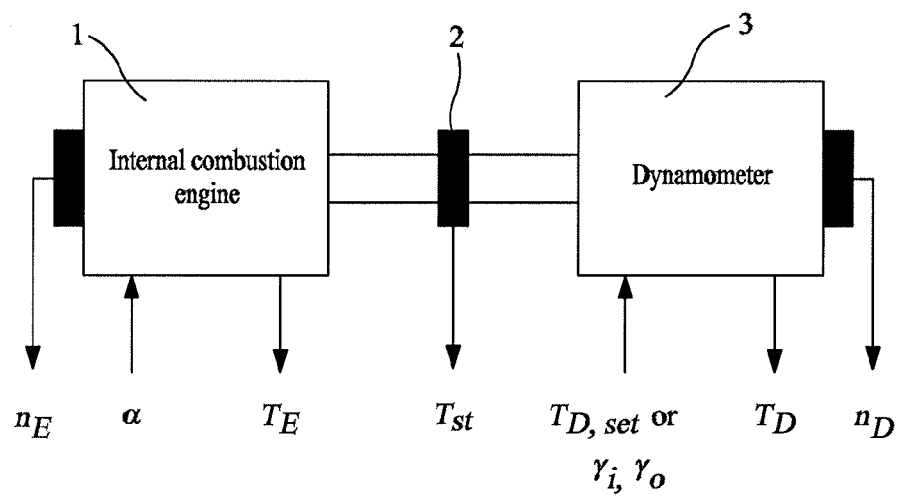
FIG. 1 shows schematically a dynamic test bench for internal combustion engines with a dynamic torque generator.

On a dynamic test bench shown schematically in FIG. 1, a test object 1 in the form of an internal combustion engine is connected by means of a test shaft 2 to a load machine 3 which exerts a torque on the test object. According to the invention, this load machine is a hydrodynamic machine, the filling level or filling level variation of which is controlled by means of at least one outlet valve alone or by means of at least one inlet valve and at least one outlet valve together in order to vary the torque generated. The approaches used up to now for controlling hydrodynamic machines with inlet and outlet valve(s) provide closed-loop control of the torque mainly by means of the outlet valve, while the temperature at the outlet or the temperature difference between inlet and outlet is influenced mainly by means of the inlet valve and therefore by the flow through the machine. The temperature at the outlet or the temperature difference is not a quantity which is to be regulated per se; it is only necessary to ensure that specified limits are maintained. However, these known solutions restrict the variation in filling level, wherein particularly an increase in torque is sometimes subject to considerable delays.

Figure 2:
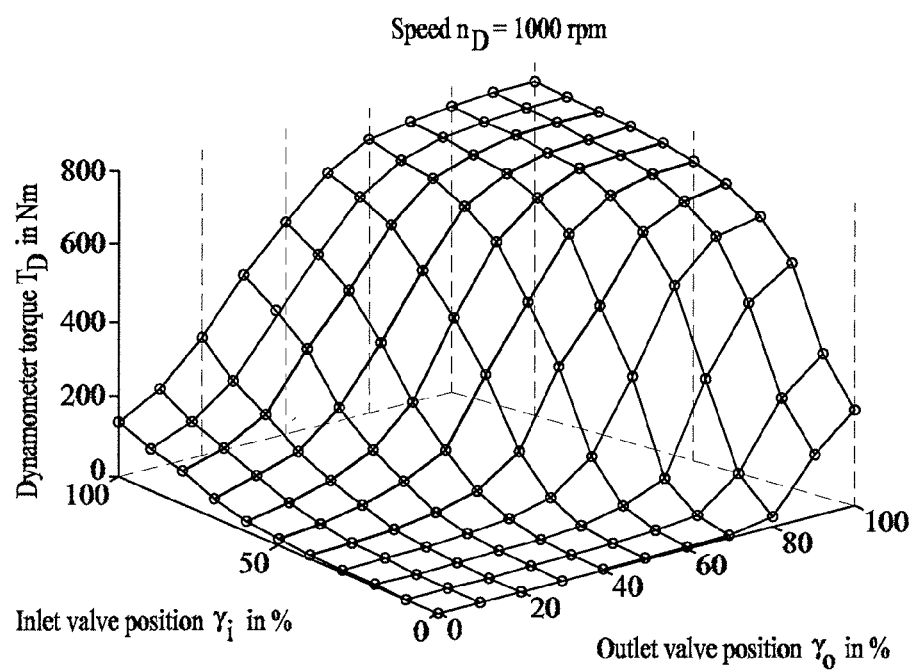
FIG. 2 is a diagram of the torque provided by a hydrodynamic torque generator as a function of the valve positions for a speed n=1000 rpm.

According to the invention, a control system which consists of an open-loop feed-forward controller and a closed-loop feedback controller is now implemented in the control device of the hydrodynamic machine. The open-loop feed-forward controller is based on an inversion of the static, non-linear characteristic map (see FIG. 2) of the torque generator which describes the relationship between the valve positions, the speed and the resulting torque. It is only necessary for the characteristic map for a hydrodynamic machine to be recorded once. The measurements necessary for producing the static, non-linear characteristic map can be reduced by using "Design of Experiments (DOE)".

The positions of inlet and outlet valve are calculated from the required torque in the open-loop feed-forward controller using an additional condition. This is necessary, as one and the same torque can be achieved with a multiplicity of valve positions. If, as is preferably provided by the invention, the inlet and the outlet valve are used simultaneously to control both the torque and the adherence to the temperature limits, the torque can be varied more quickly. If, for example, the filling level of the hydrodynamic machine and therefore the torque is to be increased, then this is achieved most quickly by completely closing the outlet valve and completely opening the inlet valve.

Figure 3:
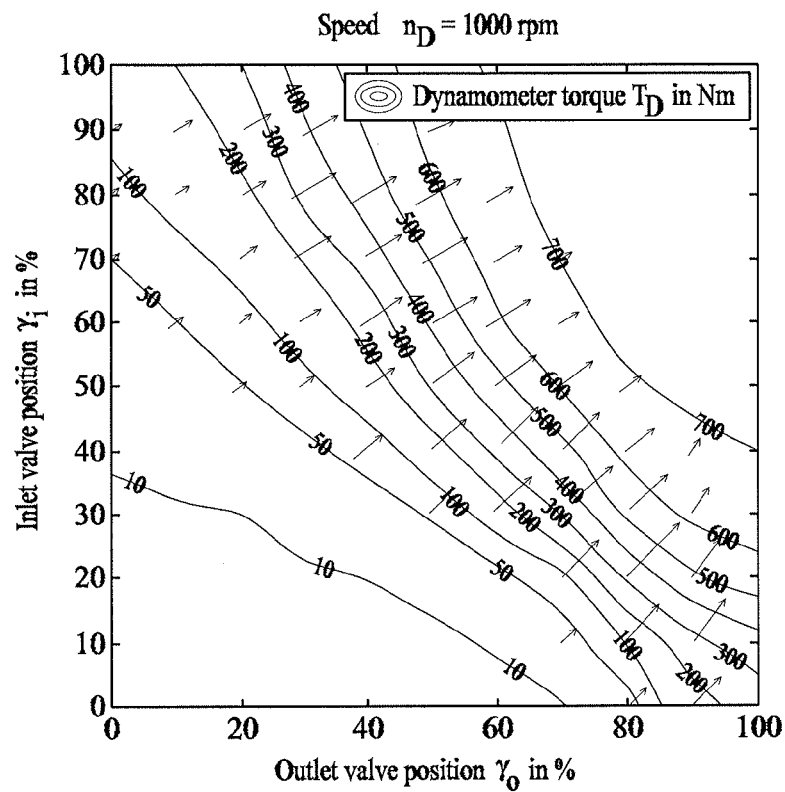
FIG. 3 shows the contour lines for FIG. 2.

The use of one controller for both the inlet and the outlet is encouraged by the slope of the lines with equal torque below 45°. A correction as a result of disturbances, deviations between model and controlled system, etc., is therefore carried out approximately at right angles to the lines with equal torque, FIG. 3 shows the torque of the hydrodynamic machine as a function of the two valve positions for a constant speed. Those valve positions with the smallest distance from a "design point", for which the required torque is achieved, are calculated in the specific case. As a result, the brake operates in the middle of the operating range. Although the gradient of the torque is not maximal in this range, this range represents a good compromise between the slope of the characteristic map and the suppression of disturbances. In addition, this guarantees a certain flow through the hydrodynamic machine at all times, and the temperature at the outlet or the temperature difference remains within the specified limits. Furthermore, by correcting the design point, it is possible to influence the flow through the hydrodynamic machine and therefore to guarantee the temperature limits as long as the required torque and the required power lie below the permissible limits of the machine.

The concept of the feedback controller for compensating disturbances, for offsetting deviations between model and controlled system, is likewise based on FIG. 3. According to FIG. 2 and FIG. 3, if possible, the two valves are operated in the middle of the operating range by means of this activation and the introduction of a "design point". In order to maintain the specified limits, on the one hand, this activation is supplemented by shifting the "design point" depending on the wafer temperature at the outlet or the temperature difference between inlet and outlet. On the other, the activation of the valves is supplemented by a torque control loop.

For a fixed speed, many combinations of valve positions for a given torque lie on a line with a slope of less than 45°. Only for valve positions in the region of 0% and 100% is this no longer the case. However, these regions should be avoided, as otherwise the hydro-dynamic machine cannot be operated reliably and economically. Operating the dynamometer at the torque or power limit leaves no reserve capacity.

This makes it possible to compensate for disturbances and deviations by means of both valve positions together and simultaneously using a single feedback controller. In steady-state operation, this is achieved by a slight variation in the valve positions, and the hydrodynamic brake is therefore still operated near to the middle of the operating range.

Figure 4:
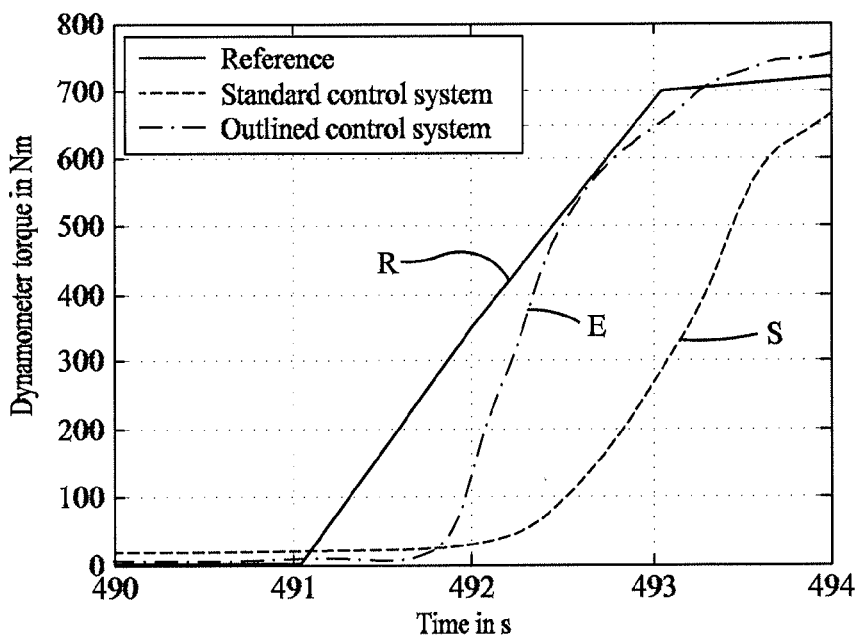
FIG. 4 is a diagram which represents the delayed development of torque with a substantially empty torque generator.

The limited dynamics of torque generators of any type can then be compensated for by the introduction of a delay and a filter which prepares the torque generator. For example, variations in the torque of a partially filled water brake can be quickly implemented, especially at higher speeds. If the hydrodynamic machine is substantially empty, then there is a delay when the filling level is increased. FIG. 4 shows this tracking behavior of a varying speed demand (R) when using a standard control system (S) and the control system (E) according to the invention.

On the one hand, the characteristics of the references can be specified manually by an operator; on the other, for test cycles, these are already known in advance. In both cases, the torque generator can be prepared for a variation in torque by using this information to change the working point of the torque generator and therefore to be able to follow the given reference considerably more accurately, albeit offset in time. If the water brake is substantially empty, the filling level can start to be changed before the torque reference is actually varied. This enables a dead time to be compensated for. If the demand is set manually, the reference must be delayed for this purpose; this, however, has no effect on the actual operation of the test bench.

The invention claimed is:

1. A method of controlling a hydrodynamic torque generator which has an inlet valve and an outlet valve for operating fluid, said method comprising the steps of:
    connecting to said inlet valve and to said outlet valve a control device to control positioning of said inlet valve and said outlet valve, said control device including an open-loop feedforward controller and a closed-loop feedback controller,
    providing a static, non-linear characteristic map that describes an interrelationship of inlet and outlet valve positionings, speed and resulting torque of the hydrodynamic torque generator, and
    controlling positionings of at least one of said inlet valve and said outlet valve using said open-loop feedforward controller and said closed-loop feedback controller to control operating fluid fill level in said hydrodynamic torque generator, said open-loop feedforward controller determining valve positionings from an inversion of said static, non-linear characteristics map to achieve a desired torque, and said closed-loop feedback controller adjusting the determined positioning to compensate for disturbances.

2. The method according to claim 1, comprising simultaneously controlling positionings of said inlet valve and said outlet valve.

3. The method according to claim 1, wherein said positionings of at least one of said inlet valve and said outlet valve includes evaluation of a temperature of operating fluid.

* * * * *